(12) United States Patent
Stockwell et al.

(10) Patent No.: US 7,118,206 B1
(45) Date of Patent: *Oct. 10, 2006

(54) GAS BUBBLE REMOVAL FROM INK-JET DISPENSING DEVICES

(75) Inventors: John S. Stockwell, Sylmar, CA (US); Raymond Mathew Soliz, Chatsworth, CA (US); Stephen A. Ruatta, South Pasadena, CA (US); Jon Jody Fong, Calabasas, CA (US)

(73) Assignee: 3D Systems, Inc., Valencia, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 10/804,310

(22) Filed: Mar. 19, 2004

(51) Int. Cl.
B41J 2/19 (2006.01)
B41J 2/175 (2006.01)

(52) U.S. Cl. .......................... 347/92; 347/85
(58) Field of Classification Search ................ 347/1, 347/2, 4, 19, 36, 85–87, 92–93; 425/215, 425/375; 427/466, 470; 264/113; 700/97–98, 700/118
See application file for complete search history.

(56) References Cited

U.S. PATENT DOCUMENTS

| | | | |
|---|---|---|---|
| 4,149,172 A * | 4/1979 | Heinzl et al. ................. 347/92 |
| 4,301,459 A * | 11/1981 | Isayama et al. ............... 347/19 |
| 5,555,176 A | 9/1996 | Menhennett et al. |
| 5,963,237 A * | 10/1999 | Ikkatai et al. ................. 347/85 |
| 6,007,193 A * | 12/1999 | Kashimura et al. ........... 347/92 |
| 6,270,335 B1 | 8/2001 | Leyden et al. |
| 6,481,837 B1 * | 11/2002 | Askren et al. ................. 347/85 |
| 6,517,189 B1 * | 2/2003 | Ogawa et al. ................. 347/35 |
| 6,609,780 B1 * | 8/2003 | Sugiyama ..................... 347/33 |
| 6,854,834 B1 * | 2/2005 | Hara et al. .................... 347/85 |
| 6,902,246 B1 * | 6/2005 | Varnon et al. ................. 347/1 |

OTHER PUBLICATIONS

U.S. Appl. No. 09/971,337; USA.282 "Selective Deposition Modeling With Curable Phase Change Materials" Inventors: Schmidt et al., filed May 1, 2003.
U.S. Appl. No. 09/971,24; USA.269 "Ultra-Violet Light Curable Hot Melt Composition" Inventors: Schmidt et al., filed May 15, 2003.
U.S. Appl. No. 09/970,956; USA.229 "Quantized Feed System For Solid Freeform Fabrication" Inventors: Varnon et al., filed Apr. 3, 2003.
U.S. Appl. No. 10/625,745; USA.349 "Accumulation, Control and Accounting of Fluid By-Product from a Solid Deposition Modeling Process" Inventors: Stockwell et al., filed Jul. 23, 2003.

* cited by examiner

Primary Examiner—Anh T. N. Vo
(74) Attorney, Agent, or Firm—Ralph D'Alessandro; Paul F. Pedigo; Summa, Allan & Additon, P.A.

(57) ABSTRACT

A method and apparatus for effectively removing gas bubbles in systems fed to ink-jetting devices. The system removes both small and large-scale gas bubbles from systems that feed materials to ink jet print heads.

19 Claims, 8 Drawing Sheets

GAS BUBBLE REMOVAL FROM INK-JET DISPENSING DEVICES

BACKGROUND OF THE INVENTION

1. Field of the Invention

The invention relates in general to a system and a method for effectively removing entrained gas bubbles from a feed material system for an ink-jet material dispensing system. The system and method is designed to completely remove entrained gas bubbles before the feed material is fed to an ink-jet print head.

2. Description of the Prior Art

Recently, several new technologies have been developed for the rapid creation of models, prototypes, and parts for limited run manufacturing. These new technologies can generally be described as solid freeform fabrication, herein referred to as "SFF". Some SFF techniques include stereolithography, selective deposition modeling, three-dimensional printing, laminated object manufacturing, selective phase area deposition, multi-phase jet solidification, ballistic particle manufacturing, fused deposition modeling, particle deposition, laser sintering, and the like. In SFF, complex parts are produced from a modeling material in an additive fashion as opposed to conventional fabrication techniques, which are generally subtractive in nature. For example, in conventional fabrication techniques material is removed by machining operations or shaped in a die or mold to near net shape and then trimmed. In contrast, additive fabrication techniques incrementally add portions of a build material to targeted locations, typically layer by layer, in order to build a complex part.

SFF technologies typically utilize a computer graphic representation of a part and a supply of a build material to fabricate the part in successive layers. SFF technologies have many advantages over the prior conventional manufacturing methods. For instance, SFF technologies dramatically shorten the time to develop prototype parts and can quickly produce limited numbers of parts in rapid manufacturing processes. They also eliminate the need for complex tooling and machining associated with the prior conventional manufacturing methods, particularly when creating molds for casting operations. In addition, SFF technologies are advantageous because customized objects can be produced quickly by processing computer graphic data.

One category of SFF that has emerged is selective deposition modeling, herein referred to as "SDM". In SDM, a build material is physically deposited in a layerwise fashion while in a flowable state and is allowed to solidify to form an object. In one type of SDM technology the modeling material is extruded as a continuous filament through a resistively heated nozzle. In yet another type of SDM technology the modeling material is jetted or dropped in discrete droplets in order to build up a part. In one particular SDM apparatus, a thermoplastic material having a low-melting point is used as the solid modeling material, which is delivered through a jetting system such as those used in ink jet printers. One type of SDM process utilizing ink jet print heads is described, for example, in U.S. Pat. No. 5,555,176 to Menhennett, et al.

Because ink jet print heads are designed for use in two-dimensional printing, special modifications must be made in order to use them in building three-dimensional objects by SFF techniques. This is generally because there are substantial differences between the two processes requiring different solutions to different problems. For example, in two-dimensional printing a relatively small amount of ink is jetted and allowed to dry or solidify with a significant interest being given to print resolution. Because only a small amount of material is jetted in two-dimensional printing, the material reservoir for the liquid material can reside directly in the ink jet print head while providing the ability to print numerous pages before needing to be refilled or replaced. In contrast, in SDM utilizing an ink-jet print head, a normally solid material, such as a photo curable, thermoplastic, or wax material, is frequently employed and often must be heated to a flowable state in order to be jetted, and then allowed to solidify. Furthermore, in SDM dispensing resolution is not as critical as it is in two-dimensional printing. This is generally because, for each targeted pixel location, the amount of material to be jetted in SDM techniques is substantially greater than the amount to be jetted in two-dimensional printing techniques. For example, it may be required to deposit six droplets on a particular pixel location in SDM compared to just one or two droplets in two-dimensional printing. Although the targeting accuracy may be the same, the actual resolution achieved in SDM techniques is generally somewhat less than in two-dimensional printing because the six droplets dispensed may droop or slide towards adjacent pixel locations.

The differences mentioned above are significant and create a number of problems to be resolved. For instance, the amount of material deposited in inkjet based SDM techniques, both in volume and in mass, can be so substantial that it is generally considered impractical to mount a reservoir directly on the ink jet print head to hold all of the material. Thus, it is typical in most SDM systems to provide a large reservoir at a remote location from the print head that is in communication with the ink print head via a material delivery system having a flexible umbilical cord. However, the large container and umbilical cord must be heated to cause at least some of the build material to become or remain flowable so that the material can flow to the dispensing device. Undesirably, start up times are longer for SDM techniques using ink jet print heads than in two-dimensional printing with ink jet print heads due to the length of time necessary to initially heat the solidified material in the large remote reservoir to its flowable state. In addition, a significant amount of energy is required to maintain the large quantity of material in the flowable state in the reservoir and in the delivery system during the build process. This undesirably generates a significant amount of heat in the build environment.

Another problem that is unique to SDM techniques is that the layers being formed must be shaped or smoothed during the build process to establish a uniform layer. Normalizing the layers is commonly accomplished with a planarizer that removes a portion of the material dispensed in the layers. One such planarizer is disclosed in U.S. Pat. No. 6,270,335 to Leyden et al. However, the planarizer produces waste material during the build process that must be handled. By-product waste handling systems for dealing with the aforementioned waste stream from an SDM process is described in U.S. patent application Ser. Nos. 09/970,956, and 10/625,745, both from 3D Systems, Inc., and both incorporated herein by reference.

Whether the system is a SDM type system, the three dimensional printing type, or a more conventional two dimensional ink-jet system, an ongoing problem with these systems is the possibility of gas bubbles introduced in the feed material systems entering the print head of an ink-jet dispensing system. Once such gas bubbles reach the print head the performance of the jets is impaired and recovery is difficult. In an SDM type of system, where different build and support materials are employed, the problem is compounded. Often the filter screen in the ink-jet print head becomes blocked with gas bubbles preventing the flow of build or support material to the orifices or the orifices themselves become blocked with gas bubbles. This problem often requires a visit from an experienced field service engineer to carefully disassemble the system to remove gas bubbles, or replacement of the print head if purging of the trapped gas bubbles is not successful. A number of design approaches have been used to avoid this issue. They usually involve careful design of the feed containers to help eliminate initial incorporation of gas bubbles in the feed material or periodic vacuum purging of the print heads. But this problem continues to be an issue.

The problem of such gas bubbles is particularly difficult in some material systems because more than one type of gas bubble can be present in the system. Particularly it can often happen that both large, easily observable macro gas bubbles are seen in these systems and there can be innumerable small and almost invisible to the naked eye micro gas bubbles. These small-scale bubbles, which behave in a less buoyant manner are sometimes easily entrained in the liquid and will not readily rise to the top of any liquid flow or in any vessel. Yet these micro bubbles can accumulate in the filters of the ink-jet heads and eventually either plug the filters or breakthrough the filters and plug the individual jets of the ink-jet head.

These and other difficulties of the prior art are overcome according to the present invention by providing a new, simple gas bubble remover in an ink-jet dispensing system that ensures that gas bubbles in the system, whether introduced in the feed containers, or introduced by leakage, and whether macro or micro bubbles are effectively removed from the material feed stream immediately before it enters the ink-jet print head.

BRIEF SUMMARY OF THE INVENTION

The instant invention provides its benefits across any ink-jet material dispensing system that requires removal of gas bubbles during a build. Providing a unique gas bubble removal vessel in line between the materials feed system and the ink-jet head does this.

It is one aspect of the instant invention to provide a gas bubble removal system for SFF systems that overcomes the earlier mentioned disadvantages of prior art systems.

It is another aspect of the instant invention to provide a gas bubble removal system that operates in an automated manner without operator intervention.

It is another aspect of the instant invention to provide a gas bubble removal system for a solid freeform fabrication apparatus.

It is another aspect of the invention to provide a gas bubble removal system that operates to eliminate both macro and micro gas bubbles.

These and other aspects, features and advantages are provided by a method for removing gas bubbles from a feed material to an ink-jet material dispensing system, the method including at least the steps of delivering the feed material to a bubble removal vessel, then allowing gas bubbles in the feed material to rise to top of the bubble removal vessel, then removing bubble free feed material from a point near the bottom of the bubble removal vessel, then feeding the bubble free feed material to an ink-jet print head, then removing gas from the top of the bubble removal vessel by venting the bubble removal vessel.

The invention also includes an apparatus for removing gas bubbles from an ink-jet material dispensing system that includes at least a bubble removal vessel including an inlet port, an exit port, a level sensor, and a vent port; as well as a means for feeding a feed material to the inlet port, a means for removing the feed material from the exit port for delivery to an ink-jet print head, and a means for venting the gas bubbles from said vent port.

The invention also includes a solid freeform fabrication apparatus for forming a three-dimensional object in a layerwise fashion by dispensing at least one material, the apparatus including at least a build environment having a build platform for supporting the three-dimensional object while it is being formed, at least one dispensing device adjacent the build platform for dispensing the material to form layers of the three-dimensional object; a motion means for respectively moving the dispensing device and the build platform with respect to each other, a means for normalizing the layers of the dispensed material thereby producing waste material, a computer controller for receiving object data descriptive of the three-dimensional object and for processing the data and controlling the apparatus when forming the three-dimensional object, a material delivery means for receiving and delivering at least one material to the dispensing device, a waste removal means for depositing the waste material in a waste receptacle, and the material delivery means includes an apparatus for removing gas bubbles from the material including at least a bubble removal vessel including an inlet port, an exit port, a level sensor, and a vent port, a means for feeding a feed material to the inlet port, a means for removing the feed material from the exit port for delivery to the dispensing device, and a means for venting the gas bubbles from the vent port.

These and other aspects, features, and advantages are achieved according to the method and apparatus of the present invention that employs a unique gas bubble removal system that automatically and reliably removes both macro and micro gas bubbles from feed materials immediately before they are fed to an ink-jet dispensing system.

BRIEF DESCRIPTION OF THE DRAWINGS

These and other aspects, features and advantages of the present invention method and apparatus will become apparent upon consideration of the following detailed disclosure of the invention, especially when it is taken in conjunction with the accompanying drawings wherein.

DETAILED DESCRIPTION OF THE PREFERRED EMBODIMENTS

Figure 1:
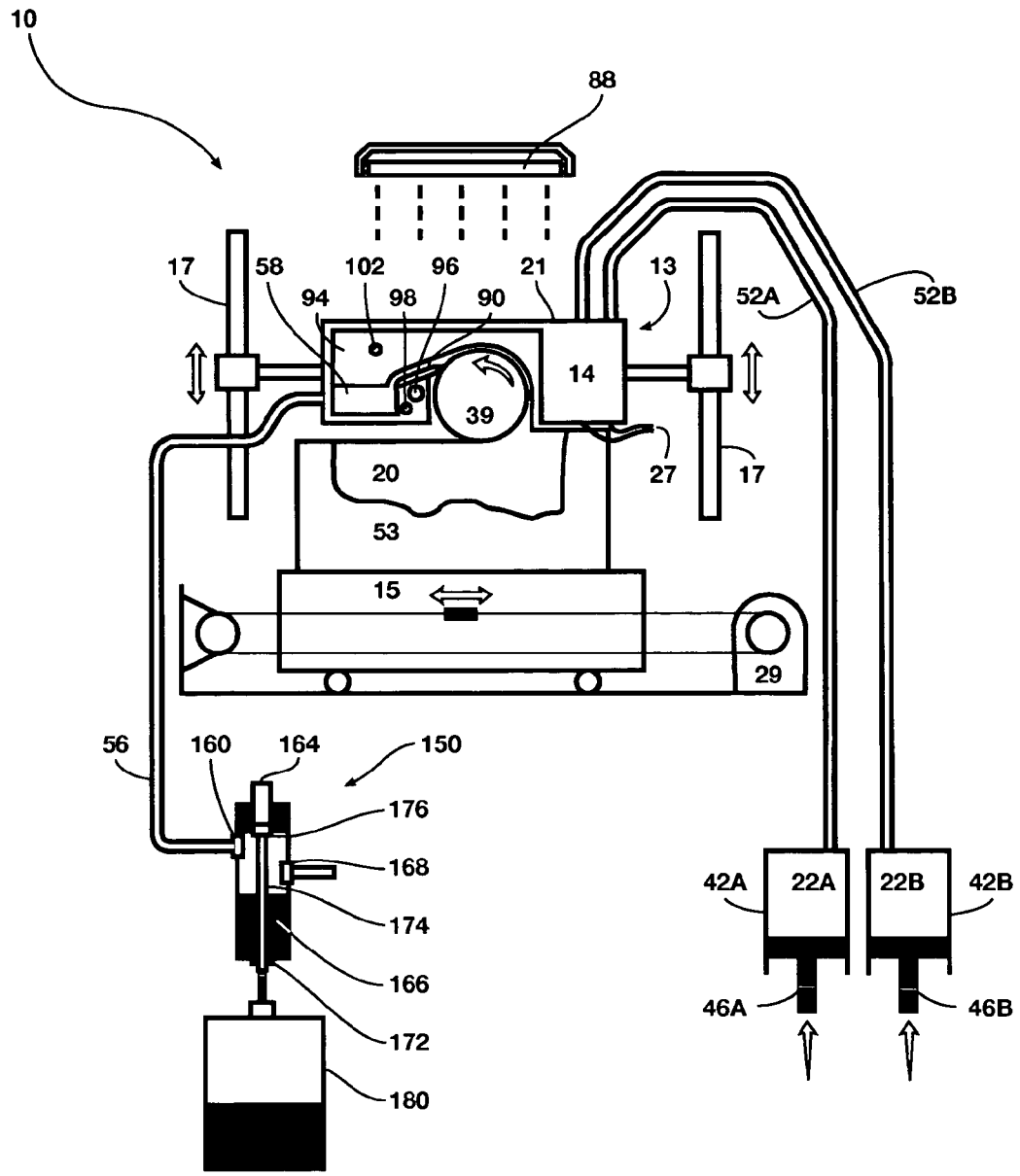
FIG. 1 is a schematic view of a prior art SDM apparatus.

The present invention provides its benefits across a broad spectrum of SFF processes, as well as two-dimensional ink-jet applications. While the description that follows hereinafter is meant to be representative of a number of such applications, it is not exhaustive. As will be understood, the basic apparatus and methods taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

The present invention can be applicable to conventional two-dimensional ink-jet printing. It can also be applied to solid freeform fabrication using three-dimensional printing in which a binder is injected in a selective manner into powders using ink-jet devices. The invention will be described however primarily with respect to solid deposition modeling (SDM) utilizing a build material dispensed in a flowable state.

As used herein, the term "a flowable state" of a build material is a state wherein the material is unable to resist shear stresses that are induced by a dispensing device, such as those induced by an ink jet print head when dispensing the material, causing the material to move or flow. Preferably the flowable state of the build material is a liquid state, however the flowable state of the build material may also exhibit thixotropic properties. The term "solidified" and "solidifiable" as used herein refer to the phase change characteristics of a material where the material transitions from the flowable state to a non-flowable state. A "non-flowable state" of a build material, as used herein, is a state wherein the material is sufficiently self-supportive under its own weight so as to hold its own shape. Build materials existing in a solid state, a gel state, a paste state, or a thixotropic state are examples of a non-flowable state of a build material for the purposes of discussion herein. Further, the term "cured" or "curable" refers to any polymerization reaction. Preferably the polymerization reaction is triggered by exposure to radiation or thermal heat. Most preferably the polymerization reaction involves the cross-linking of monomers and oligomers initiated by exposure to actinic radiation in the ultraviolet or infrared wavelength band. Further, the term "cured state" refers to a material, or portion of a material, in which the polymerization reaction has substantially completed. It is to be appreciated that as a general matter the material can easily transition between the flowable and non-flowable state prior to being cured. However, once cured, the material cannot transition back to a flowable state and be dispensed by the apparatus.

The term "feed material" will be used in this specification to refer to the liquid material fed to an ink-jet print head. A feed material to an SDM apparatus could be either a "support" or a "build" material. The term "support material" refers to any material that is intended to be dispensed to form a support structure for the three-dimensional objects as they are being formed, and the term "build material" refers to any material that is intended to be dispensed to form the three-dimensional objects. The build material and the support material may be similar materials having similar formulations or dissimilar materials having different formulations, but, for purposes herein, they are to be distinguished only by their intended use.

A preferred method for dispensing a curable phase change material to form a three-dimensional object and for dispensing a non-curable phase change material to form supports for the object is disclosed in the co-pending U.S. patent application Ser. No. 09/971,337 entitled "Selective Deposition Modeling with Curable Phase Change Materials", which is herein incorporated by reference as set forth in full. A preferred curable phase change build material and non-curable phase change support material are disclosed in the co-pending U.S. patent application Ser. No. 09/971,247 entitled "Ultra-Violet Light Curable Hot Melt Composition", which is herein incorporated by reference as set forth in full.

Referring particularly to FIG. 1 there is illustrated generally by the numeral 10 a prior art solid freeform fabrication apparatus of the SDM type that can be adapted to incorporate the gas bubble removal system of the instant invention. This apparatus 10 is shown including schematically a material feed and waste accumulator indicated generally by the numeral 150. The build platform 15 is reciprocally driven by conventional drive means 29. The dispensing trolley 21 is precisely moved by actuation means 17 vertically to control the thickness of the layers of the object 20. The actuation means 17 comprises precision lead screw linear actuators driven by servomotors. The ends of the linear actuators 17 reside on opposite ends of the build environment 13 and in a transverse direction to the direction of reciprocation of the build platform. However for ease of illustration in FIG. 1 they are shown in a two-dimensionally flat manner giving the appearance that the linear actuators are aligned in the direction of reciprocation of the build platform 15. Although they may be aligned with the direction of reciprocation it is sometimes preferred they be situated in a transverse direction so as to optimize the use of space within the apparatus.

In the build environment illustrated generally by numeral 13 in FIG. 1, there is shown by numeral 20 a three-dimensional object being formed with integrally formed supports 53. The object 20 and supports 53 both reside in a sufficiently fixed manner on the build platform 15 so as to sustain the acceleration and deceleration effects during reciprocation of the build platform 15 while still being removable from the platform. In order to achieve this, it is desirable to dispense at least one complete layer of support material on the build platform 15 before dispensing the build material since the support material is designed to be removed at the end of the build process. In this embodiment, the build material identified by numeral 22A is dispensed by the dispensing device 14 in fluid flow communication with material feed container 42A to form the three-dimensional object 20, and the support material identified by numeral 22B is dispensed from feed container 42B to dispensing device 14 to form the support 53. Containers identified generally by numerals 42A and 42B, respectively hold a discrete amount of these two materials 22A and 22B. Umbilicals 52A and 52B, respectively deliver the materials to dispensing device 14, which in the preferred embodiment is an ink jet print head having a plurality of dispensing orifices 27.

Preferably the materials 22A and 22B of FIG. 1 are phase change materials that are heated to a liquid state, and heaters (not shown) are provided on the umbilicals 52A and 52B to maintain the materials in a flowable state as they are delivered to the dispensing device 14. In this embodiment the ink jet print head is configured to dispense both materials from a plurality of dispensing orifices so that both materials can be selectively dispensed in a layerwise fashion to any location in any layer being formed. When the dispensing device 27 needs additional material 22A or 22B, extrusion bars 46A and 46B are respectively engaged to extrude the material from the containers 42A and 42B, through the umbilicals 52A and 52B, and to discharge orifices 27 of the dispensing device 14.

The dispensing trolley 21 in the embodiment shown in FIG. 1 comprises a heated planarizer 39 that removes excess material 22A and 22B from the layers being dispensed to normalize the dispensed layers. The heated planarizer 39 contacts the build and support material 22A and 22B in a non-flowable state and because it is heated, locally transforms some of the material to a flowable state. Due to the forces of surface tension, this excess flowable material 22A and 22B adheres to the surface of the planarizer 39 and, as the planarizer 39 rotates, the material is brought up to the skive 90 which is in contact with the planarizer 39. The skive 90 separates the excess material 22A and 22B that is now waste material from the surface of the planarizer 39 and directs the flowable material into a waste reservoir identified generally by numeral 94 located on the trolley 21. A heater 96 and thermistor 98 on the waste reservoir 94 operate to maintain the temperature of the waste reservoir at a sufficient level so that the waste material 58 in the reservoir 94 remains in the flowable state.

In the prior art system of FIG. 1, an additional detection system is provided in the waste system to prevent the waste material 58 from overflowing the waste reservoir 94. The system comprises an optic sensor 102 provided in the waste reservoir 94 that detects an excess level of waste material 58 in the reservoir 94. If the level of the waste material 58 in the waste reservoir 94 raises above a set level, it is detected by the sensor 102. The sensor 102 in turn provides a signal to the computer controller, which shuts down the apparatus. This prevents waste material from flooding the components inside the apparatus 10 in the event of a malfunction of the feed and waste system. The apparatus 10 can then be serviced to correct the malfunction, thus preventing excessive damage to the apparatus.

In the prior art system shown in FIG. 1, the build material 22A is a phase change material that is cured by exposure to actinic radiation. After the curable phase change material 22A is dispensed in a layer it transitions from the flowable state to a non-flowable state. After a layer has been normalized by the passage of the planarizer 39 over the layer, the layer is then exposed to actinic radiation by radiation source 88 to cure the build material 22A. Preferably the actinic radiation is in the ultraviolet or infrared band of the spectrum. It is important, however, that planarizing occurs prior to exposing a layer to the radiation source 88. This is because the preferred planarizer can only normalize the layers if the material in the layers can be changed from the non-flowable to the flowable state, which cannot occur if the material 22A is first cured.

In conjunction with the curable build material 22A, a non-curable phase change material is used for the support material 22B. Since the support material 22B cannot be cured, it can be removed from the object and build platform, for example, by being dissolved in a solvent. Alternatively the support material 22B can be removed by application of heat to return the material to a flowable state, if desired.

In this prior art system the by-product waste material 58 comprises both materials as they accumulate during planarizing. Beginning with the waste line 56 in FIG. 1 the by-product waste material removal system is shown generally by the numeral 150 and will be described hereafter as accumulator 150. By-product waste material 58 from the waste reservoir 94 flows by gravity through line 56 and into waste accumulator 150 through inlet line 160. Accumulator 150 is a vessel that has sealable openings at the base or bottom and the top with o-ring seals that open and close when actuator 164 moves a central rod 174 up or down. When rod 174 is moved to the up position, top vent 176 is opened to the atmosphere and base drain 172 is sealed to allow accumulator 150 to fill with by-product waste. A level detector 168 senses when the level of by-product waste material 166 rises to the level detector. Level detector 168 then activates actuator 164 to move central rod 174 down; closing top vent 176 and opening base drain 172. When drain 172 opens the by-product waste material (58,166) rapidly empties through drain 172 by gravity flow into waste material receptacle 180. Because top vent 176 is closed at this time the flow of liquid waste creates a slight negative pressure, effectively pulling any residual by-product waste material 58 from line 56.

After accumulator 150 empties actuator 164 is activated to move central rod 174 up, closing the bottom seal 172 to allow accumulator 150 to begin refilling for the next cycle.

Waste material receptacle 180 in a preferred embodiment is a disposable polypropylene bag with a zipper closure that can be easily removed for disposal. It should be recognized that the use of a polypropylene bag is only one embodiment and that other bags or bottles may be employed in the instant invention. Because of the capacity of accumulator 150, the design of the instant invention allows operator to intervene to remove and replace waste receptacle 180 without interrupting the SDM build.

In another embodiment (not shown) a source of actinic radiation could be mounted near waste receptacle 180 to cure the by-product waste material in waste receptacle 180.

Figure 2:
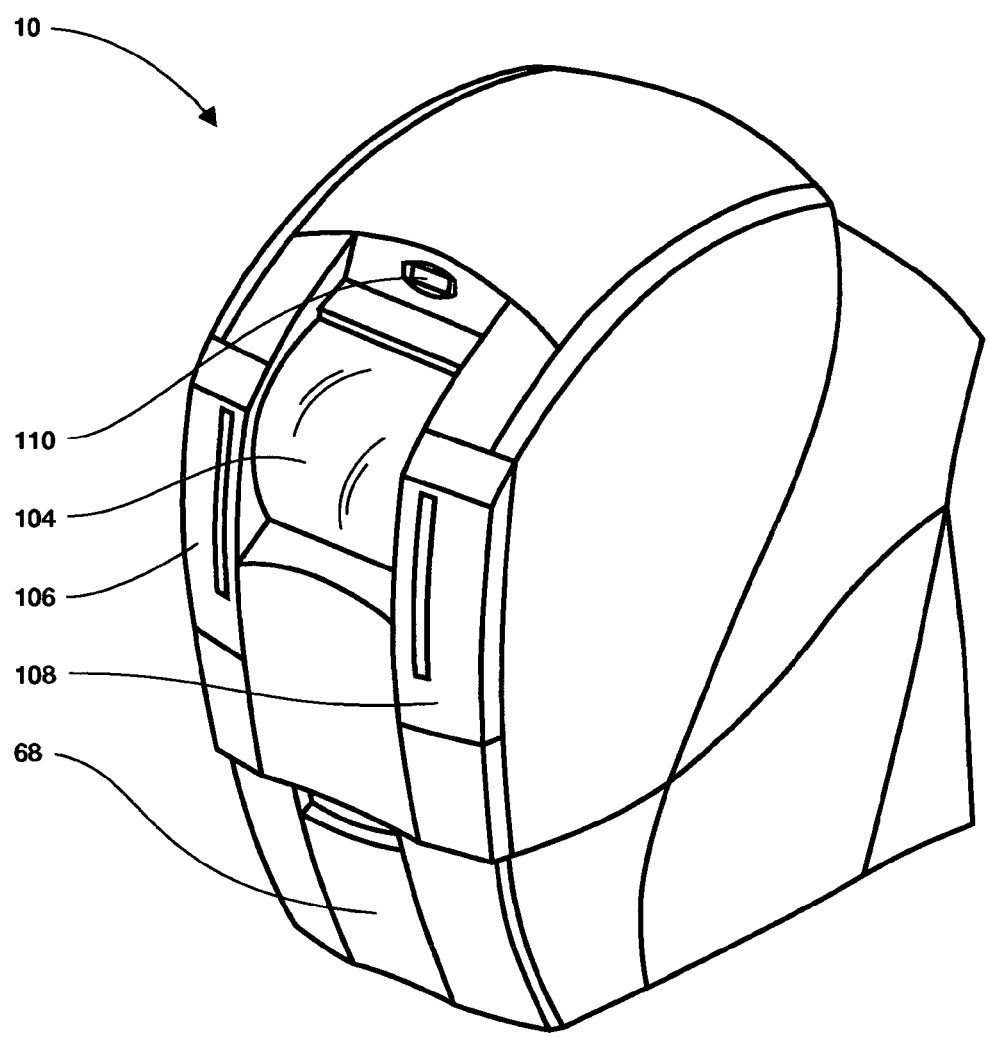
FIG. 2 is an isometric view of a SDM apparatus of the embodiment shown schematically in FIG. 1

Now referring to FIG. 2, the SDM apparatus schematically shown in FIG. 1 is shown isometrically as 10. To access the build environment, a slideable door 104 is provided at the front of the apparatus. The door 104 does not allow radiation within the machine to escape into the outside environment. The apparatus is configured such that it will not operate or turn on with the door 104 open. In addition, when the apparatus 10 is in operation the door 104 will not open. A build material feed door 106 is provided so that the build material containers (not shown) can be inserted into the apparatus 10. A support material feed door 108 is also provided so that the support material containers (not shown) can be inserted into the apparatus. A waste drawer 68 is provided at the bottom end of the apparatus 10 so that expelled containers can be removed from the apparatus 10. A user interface 110 is provided which is in communication with an external computer (also not shown), which tracks receipt of the print command data from the external computer.

Figure 3:
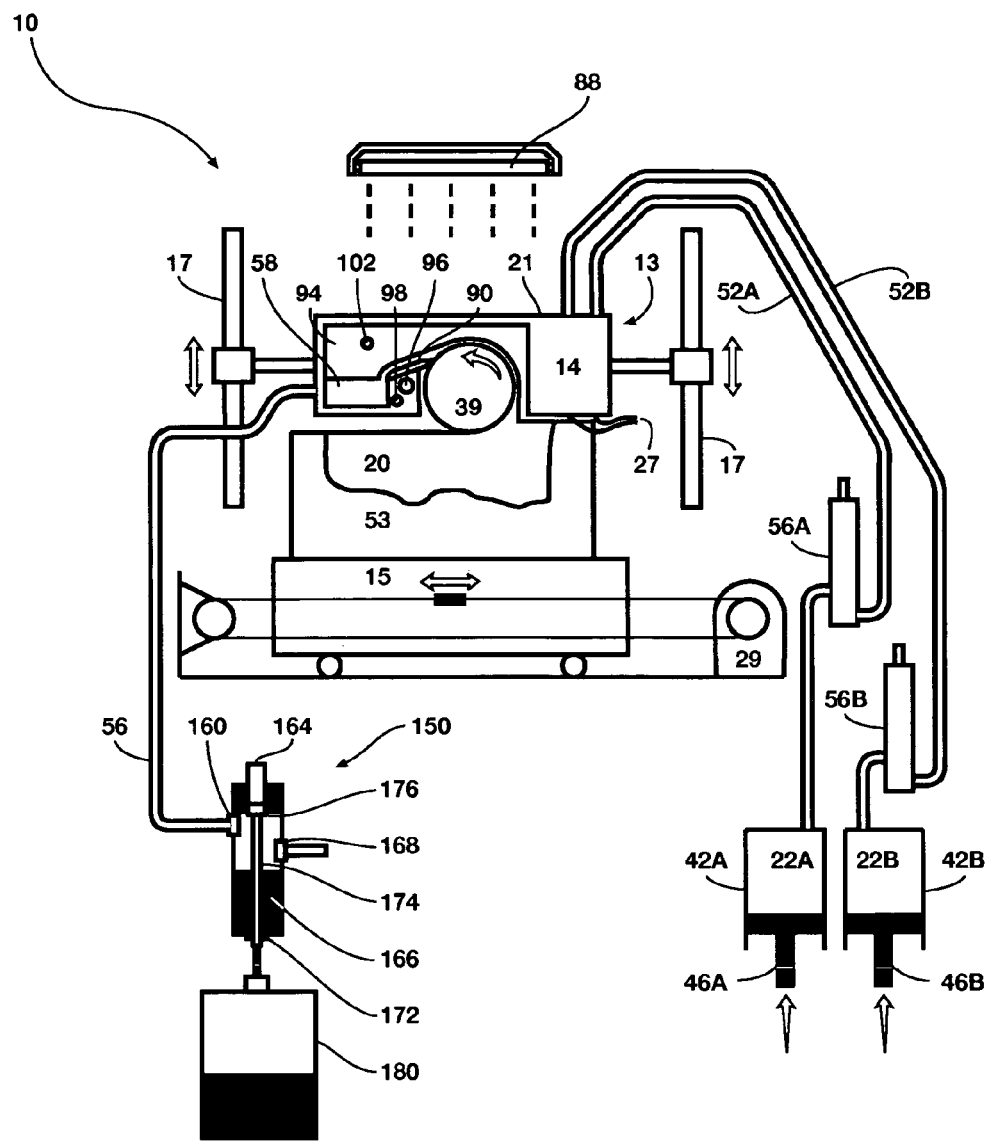
FIG. 3 is a schematic view of a preferred embodiment including the gas bubble removal vessels.

Turning to FIG. 3 a schematic of a similar SDM device is shown but with the addition of two gas bubble removal systems of the present invention. In this design gas bubble removal vessels 56A, 56B have been inserted in lines 52A and 52B respectively. Build and support materials 22A and 22B flow through the gas bubble removal vessels 56A, 56B where the gas bubbles are removed before the bubble free liquid is fed to the dispensing head 14. A more complete description of the operation of the gas bubble removal vessels 56A, 56B is provided below. It should also be recognized that the system shown schematically in FIG. 3 could operate within the same industrial design shown in the isometric view of FIG. 2.

Figure 4:
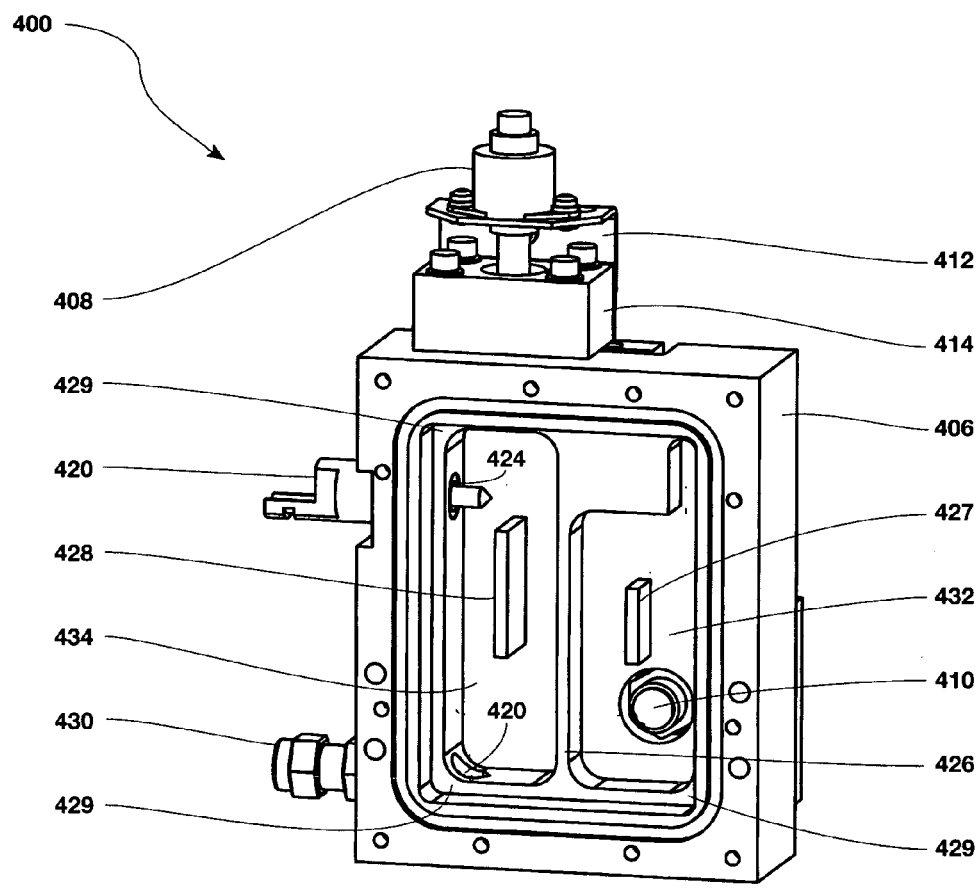
FIG. 4 is an isometric view of a preferred embodiment of the gas removal vessel of the instant invention and FIG. 5 is an isometric view of a preferred embodiment of the gas removal vessel of the instant invention.
Figure 5:
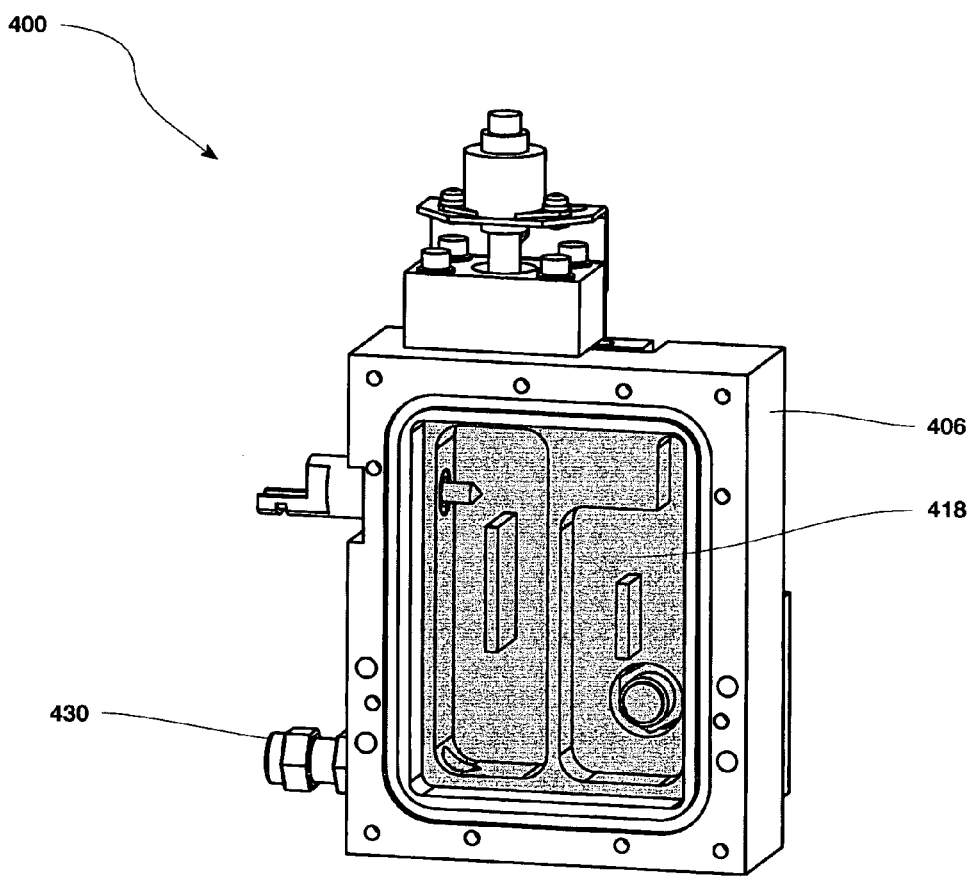
Figure 6:
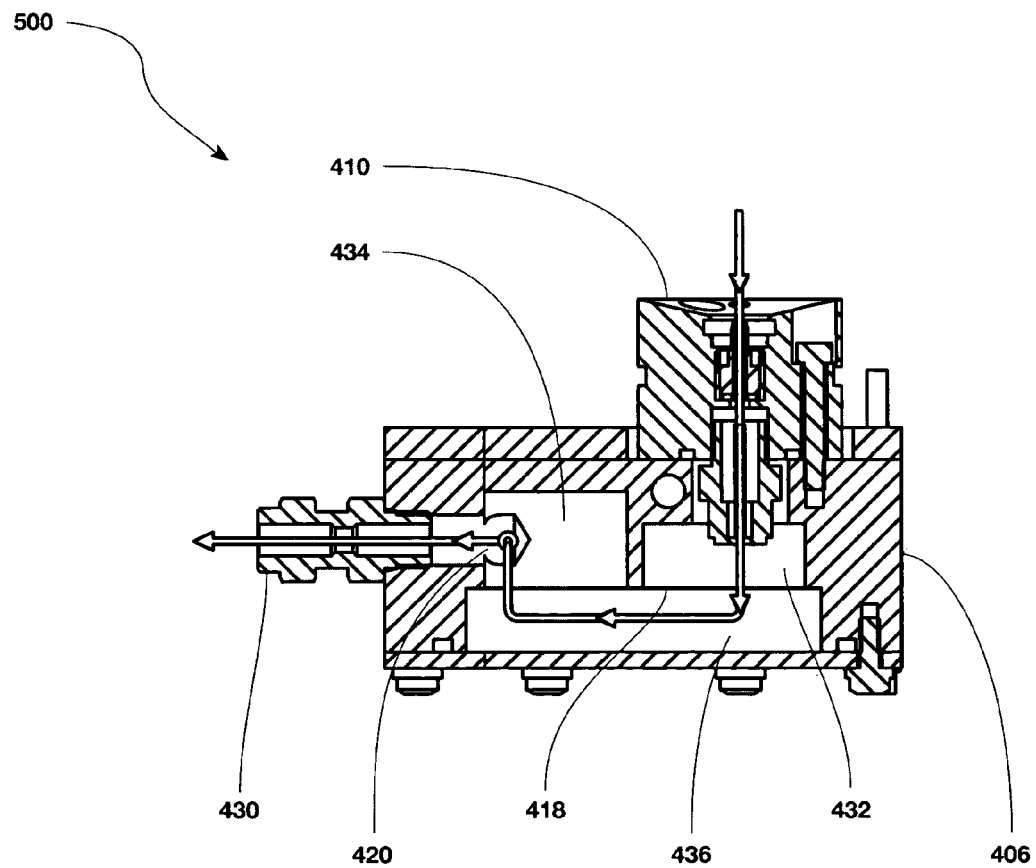
FIG. 6 is a top cutaway view of the gas removal vessel of the instant invention.
Figure 7:
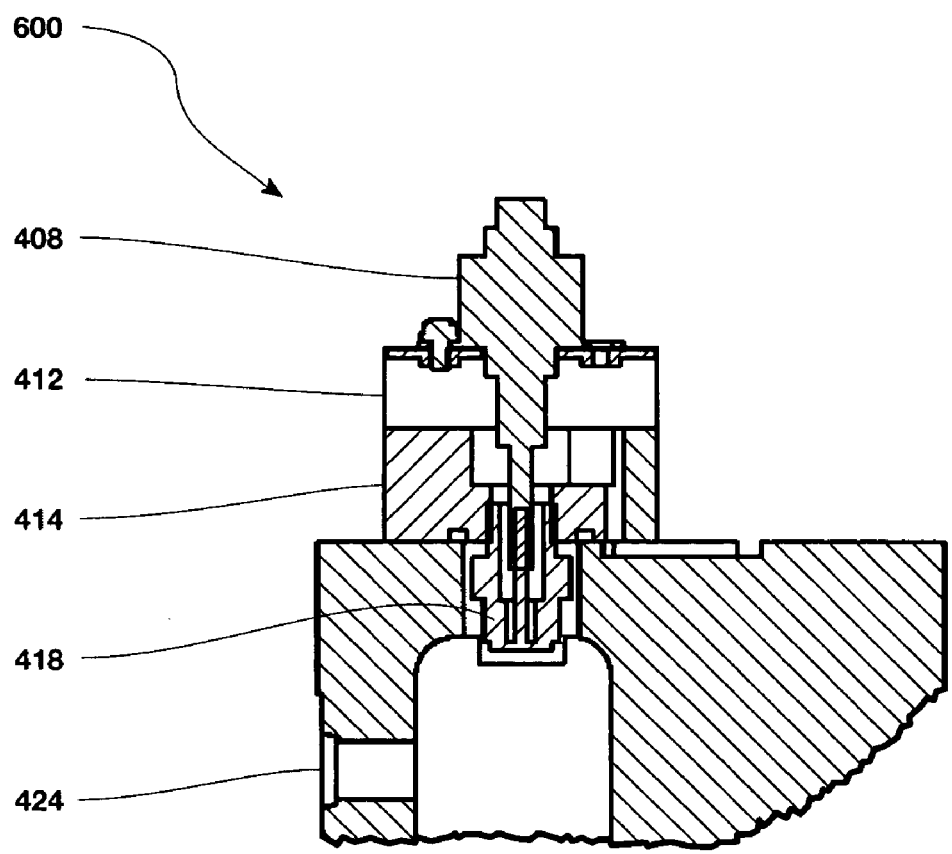
FIG. 7 is a front cutaway view of the gas removal vessel of the instant invention.

FIG. 4 is an isometric rendering showing the preferred design of the gas bubble removal vessels 56A, 56B of FIG. 3 represented generally by the numeral 400. The vessel 406 is a machined aluminum block with a hollow center. An actuator support frame 412 mounted on block 414 supports the actuator 408 that is responsive to an electrical signal (not shown) from the level sensor 420 to open a check valve (shown as 418 in FIG. 7) at the top of vessel 406. The check valve acts as an atmospheric vent to release accumulated gas. A level detector assembly 420 is shown inserted in the level sensor port 424. The level detector is preferably a reflective object optical IR sensor adapted to sense liquid available commercially from Optek Technology, Inc. of Carrollton, Tex. 75006. Connector 430 is connected via an umbilical line (not shown) to be in fluid connection with dispensing head 14 of FIG. 3. Connector 430 is connected to vessel 406 through exit port 420. The back of the interior space of block 406 is split by a central wall 426 into a right chamber 432 and a left chamber 434. Central wall 426 is attached sealingly to the back wall of vessel 406 and extends forward about half way to the front of the hollow interior of vessel 406. Shorter walls 427,428 are also attached to the back wall of vessel 406 and extend the same distance as wall 426 toward the front of the interior of vessel 406. A recessed lip 429 extending around the interior of vessel 406 is at the same distance from the back of vessel 406. The forward surfaces of walls 426, 427,428 and lip 429 are in a plane parallel to the back wall of vessel 406 and equidistant from said back wall at a position roughly halfway toward front of vessel 406. These forward surfaces provide surfaces to which a parallel porous filter mesh screen (shown as 418 in FIG. 5.) is placed across the interior of the chamber and divides the open interior space roughly into a front section and a rear section wherein the rear section is divided by wall 426 into a right chamber 432 and left chamber 434. This arrangement can be more clearly understood looking at FIGS. 5 and 6. FIG. 6 shows a top schematic view, represented generally by the numeral 500. The porous mesh filter 418 is placed across the interior of vessel 406 and separates the right 432, left 434, and front 436 chambers of the vessel. The two walls 427,428 have a primary function of supporting the porous mesh filter, which is not rigid. FIG. 7 is a cutaway schematic front view of the top of the gas removal vessel represented generally by the numeral 600. The actuator 408, mounted via support bracket 412 onto block 414 is connected to operate check valve 418, which is used to vent accumulated gases to atmoshere. Actuator 408 is responsive to an electrical signal (not shown) from level sensor 420 operating through level sensor port 424.

Although this preferred design is made from aluminum it should be recognized that the materials of construction are not critical to the instant invention and any number of materials, such as stainless steel, or plastics like polyethylene or nylon could be used.

Figure 8:
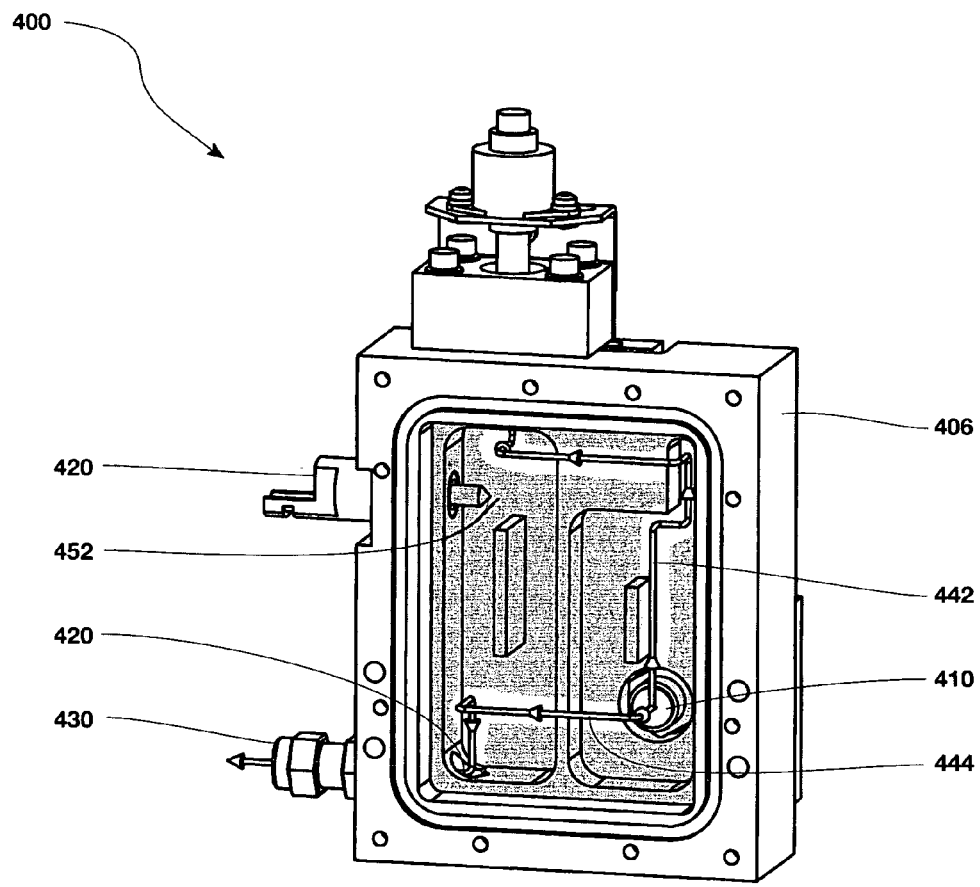
FIG. 8 is an isometric view of a preferred embodiment of the gas removal vessel of the instant invention.

In operation the instant invention operates as follows. Referring to FIG. 3 once an SDM build is in operation feed build and support materials (22A and 22B) flow from feed containers 42A and 42B to gas bubble removal vessels 56A, 56B. Turning now to FIG. 8 a feed material enters vessel 406 via inlet port 410 and fills the interior chamber of gas bubble removal vessel 406. As macro entrained gas bubbles enter the interior chamber they automatically rise to the top, as shown by flow 442. Bubble free liquid feed material exits through exit port 420, located below inlet port 410. The primary liquid flow is indicated by flow 444. Referring to both FIGS. 6 and 8, this arrangement results in liquid materials entering through inlet port 410 to flow from chamber 432 through filter mesh 418 into front section 436 and then back through filter mesh 418 into left chamber 434 before flowing out through exit port 420.

As gas bubbles accumulate near top of interior chamber 430 a liquid gas interface 452 will move down from the top. As this gas liquid interface passes in front of level sensor 420 operating through sensor port 424 the sensor detects the interface and an electrical signal is sent to actuator 408. Referring to FIG. 7 actuator 408 opens check valve 418 to briefly vent gas from the gas removal vessel. Only brief periodic venting is required to remove the relatively small amount of gas bubbles entering the system. The gas bubble removal vessels described in the instant invention operate in an automatic mode, with no operator intervention required.

There can be both large (macro) and small (micro) bubbles present in the liquid feeds to ink-jet systems. The macro bubbles are buoyant and easily rise in a liquid. Micro bubbles are so small they are sometimes invisible to the naked eye but can still be damaging to an ink-jet head, causing a vapor lock plug in the jetting orifices. The small size of these micro bubbles means that they rise only very slowly in a liquid and can be easily entrained if there is a substantial liquid flow, such as the flow of liquid through inlet port 410 and out of outlet port 420. This is the flow represented by flow 444 in FIG. 8. It has been found that the porous mesh filter 418 (of FIG. 5) of the preferred embodiment solves this problem. As the liquid flows through the mesh filter the micro bubbles are trapped by surface contact with the filter surface and not entrained with the liquid flow. This allows the trapped micro bubbles to gradually coalesce with other micro bubbles as they accumulate and as they become larger slowly rise in the liquid to the top of vessel 406 for eventual venting through check valve 418. Although one pass of the liquid with micro bubbles through the mesh filter is sufficient the preferred design ensures two passes through the filter for a more robust solution to the bubble problem.

What have been described are preferred embodiments in which modifications and changes may be made without departing from the spirit and scope of the accompanying claims.

What is claimed is:

1. A method for removing gas bubbles from a feed material to an ink-jet material dispensing system, the method comprising the steps of:
   delivering said feed material to a bubble removal vessel having a top, a bottom, and opposing sides;
   allowing gas bubbles in said feed material to rise to said top of said bubble removal vessel;
   removing bubble free feed material from a point near said bottom of said bubble removal vessel;
   feeding said bubble free feed material to an ink-jet print head; and
   removing gas from said top of said bubble removal vessel by periodically venting said bubble removal vessel responsive to a liquid level measurement in said bubble removal vessel.

2. The method of claim 1 wherein said ink-jet material dispensing system is a selective deposition modeling system for producing three-dimensional parts.

3. The method of claim 1 wherein said ink-jet dispensing system is a two-dimensional system for producing conventional two-dimensional images.

4. The method of claim 2 wherein said feed material is a support material for supporting a build material during a build process.

5. The method of claim 2 wherein said feed material is a build material for building parts during a build process.

6. An apparatus for removing gas bubbles from an ink-jet material dispensing system comprising;
 a bubble removal vessel comprising an inlet port, an exit port, a level sensor, a hollow interior, and a vent port;
 means for feeding a feed material to said inlet port;
 means for removing said feed material from said exit port for delivery to an ink-jet print head; and
 means for venting said gas bubbles from said vent port comprising a vent port seal connected to an actuating device controlled by a signal from said level sensor.

7. The apparatus of claim 6 wherein said exit port is in fluid flow communication with an ink-jet print head, and is located below said inlet port to ensure the removal of gas bubbles.

8. The apparatus of claim 6 wherein said bubble removal vessel includes an internal mesh filter for filtering of micro bubbles from said feed material.

9. A solid freeform fabrication apparatus for forming a three-dimensional object in a layerwise fashion by dispensing at least one material, the apparatus comprising:
 a build environment having a build platform for supporting the three-dimensional object while it is being formed;
 at least one dispensing device adjacent said build platform for dispensing said material to form layers of the three-dimensional object;
 a motion means for respectively moving said dispensing device and said build platform with respect to each other;
 means for normalizing the layers of said dispensed material thereby producing waste material;
 a computer controller for receiving object data descriptive of the three-dimensional object and for processing the data and controlling the apparatus when forming the three-dimensional object;
 a material delivery means for receiving and delivering said at least one material to said dispensing device;
 a waste removal means for depositing said waste material in a waste receptacle;
 wherein said material delivery means comprises:
  an apparatus for removing gas bubbles from said at least one material comprising;
 a bubble removal vessel comprising an inlet port, an exit port, a level sensor, and a vent port:
 means for feeding a feed material to said inlet port;
 means for removing said feed material from said exit port for delivery to said dispensing device;
 means for venting said gas bubbles from said vent port.

10. The apparatus of claim 9 wherein said bubble removal vessel includes an internal mesh filter for filtering of micro bubbles from said feed material.

11. A method for removing gas bubbles from an ink-jet feed material for a selective deposition modeling system for producing three-dimensional parts, the method comprising the steps of:
 delivering said feed material to a bubble removal vessel having a top, a bottom, and opposing sides;
 allowing gas bubbles in said feed material to rise to said top of said bubble removal vessel;
 removing bubble free feed material from a point near said bottom of said bubble removal vessel;
 feeding said bubble free feed material to an ink-jet print head;
 removing gas bubbles from said top of said bubble removal vessel by means for venting said bubble removal vessel through a vent port.

12. The method of claim 11 wherein said feed material is a support material for supporting a build material during a build process.

13. The method of claim 11 wherein said feed material is a build material for building parts during a build process.

14. The method of claim 11 wherein said gas removing step is performed by periodically venting said bubble removal vessel responsive to a liquid level measurement in said bubble removal vessel.

15. An apparatus for removing gas bubbles from an ink-jet feed material for a selective deposition modeling system for producing three-dimensional parts comprising:
 a bubble removal vessel comprising an inlet port, an exit port, a level sensor, a hollow interior, and a vent port;
 means for feeding a feed material to said inlet port;
 means for removing said feed material from said exit port for delivery to an ink-jet print head for a selective deposition modeling system; and
 means for venting said gas bubbles from said vent port by periodically venting said bubble removal vessel.

16. The apparatus of claim 15 wherein said means for venting said gas bubbles from said vent port comprises;
 a vent port seal connected to an actuating device controlled by a signal from said level sensor.

17. The apparatus of claim 15 wherein said exit port is in fluid flow communication with an ink-jet print head, and is located below said inlet port to ensure the removal of gas bubbles.

18. The apparatus of claim 15 wherein said bubble removal vessel includes an internal mesh filter for filtering of micro bubbles from said feed material.

19. A vessel for removing gas bubbles from an inkjet material, said vessel comprising:
 a) an inlet port for receiving the inkjet material;
 b) a first rear chamber in flow communication with said inlet port for receiving the inkjet material;
 c) a front chamber in flow communication with said first rear chamber for receiving inkjet material from said first rear chamber;
 d) a second rear chamber separated from said first rear chamber and in flow communication with said front chamber for receiving said inkjet material from said front chamber;
 e) an internal mesh filter separating said front chamber from said first and second rear chambers for separating bubbles from the inkjet material as the inkjet material passes through said mesh filter from said first rear chamber and to said front chamber and from said front chamber into said second rear chamber;
 f) an exit port in flow communication with said second rear chamber through which inkjet material having bubbles removed therefrom exits said vessel;
 g) a level sensor for sensing a gas liquid interface in said vessel; and
 h) means for venting gas bubbles, said means responsive to said level sensor, whereby bubbles separated from the inkjet material can rise to the top of the inkjet material in said vessel and be removed from said vessel through a vent port.

* * * * *

UNITED STATES PATENT AND TRADEMARK OFFICE
CERTIFICATE OF CORRECTION

PATENT NO. : 7,118,206 B1
APPLICATION NO. : 10/804310
DATED : October 10, 2006
INVENTOR(S) : John S. Stockwell et al.

It is certified that error appears in the above-identified patent and that said Letters Patent is hereby corrected as shown below:

In the Title Page:

Under References Cited item 56, delete "U.S. Appl. No. 09/971,24" and insert therefor -- U.S. Appl. No. 09/971,247 --

Signed and Sealed this

Twelfth Day of December, 2006

JON W. DUDAS
*Director of the United States Patent and Trademark Office*